US006312226B1

(12) United States Patent
Senior, Jr. et al.

(10) Patent No.: US 6,312,226 B1
(45) Date of Patent: Nov. 6, 2001

(54) DEVICE AND METHOD FOR DETECTING BEARING OVERHEATING IN TURBINE PUMP SYSTEMS

(75) Inventors: Roy F. Senior, Jr., 4545 E. Lincoln, Fresbi, CA (US) 93725; Jeffrey G. Vincent; Clifford Jon Taylor, both of Fresno, CA (US)

(73) Assignee: Roy F. Senior, Jr., Fresno, CA (US)

( * ) Notice: Subject to any disclaimer, the term of this patent is extended or adjusted under 35 U.S.C. 154(b) by 0 days.

(21) Appl. No.: 09/525,155

(22) Filed: Mar. 14, 2000

Related U.S. Application Data

(60) Provisional application No. 60/124,598, filed on Mar. 16, 1999.

(51) Int. Cl.[7] .............................. F04B 49/10; G01J 5/00
(52) U.S. Cl. .............................. 417/32; 417/63; 374/121
(58) Field of Search .............................. 417/13, 32, 63; 374/121, 100, 120, 132

(56) References Cited

U.S. PATENT DOCUMENTS

| | | |
|---|---|---|
| 2,089,369 | 8/1937 | Heckert . |
| 2,961,875 | 11/1960 | Reumund . |
| 3,052,123 | 9/1962 | Gustafson . |
| 3,824,579 | 7/1974 | Waseleski, Jr. et al. . |
| 3,926,053 | 12/1975 | Schurrer et al. . |
| 4,074,575 | 2/1978 | Bergman et al. . |
| 4,527,661 | 7/1985 | Johnstone et al. . |
| 4,854,162 | 8/1989 | Yerace et al. . |
| 5,060,760 | 10/1991 | Long et al. . |
| 5,060,890 | 10/1991 | Utterback et al. . |
| 5,066,197 | 11/1991 | Champagne . |
| 5,145,322 | 9/1992 | Senior, Jr. et al. . |
| 5,244,287 | 9/1993 | Yoshikawa . |
| 5,433,525 | 7/1995 | El-Ibiary . |
| 5,448,072 | 9/1995 | Gallagher . |
| 5,478,151 | 12/1995 | Duhrkoop . |
| 5,779,005 | 7/1998 | Jones, Jr. et al. . |
| 5,833,371 | 11/1998 | Gomez et al. . |

*Primary Examiner*—Teresa Walberg
*Assistant Examiner*—Thor Campbell
(74) *Attorney, Agent, or Firm*—Charles E. Cates; Elizabeth A. Dawn

(57) ABSTRACT

A device and method for detecting bearing overheating in oil-lubricated turbine pumps comprising and temperature transmitting collar and infrared sensor. The temperature transmitting collar is mounted on the pump line shaft immediately adjacent to the stretch bearing, which is the top bearing in the pump system. The infrared sensor is positioned within sensing distance of the temperature transmitting collar and control circuitry is provided to warn of abnormal temperatures and to turn the pump off if temperatures continue to rise to an alarm condition.

12 Claims, 4 Drawing Sheets

DEVICE AND METHOD FOR DETECTING BEARING OVERHEATING IN TURBINE PUMP SYSTEMS

This Non-Provisional Application claims the benefit of U.S. Provisional Application Ser. No. 60/124,598 filed on Mar. 16, 1999. The present invention relates to a device and method for detecting bearing overheating in oil-lubricated turbine pumps, such as the pump systems used to pump water and oil. The device and method of the present invention may also be applied to pumps generally referred to in the industry as centrifical pumps.

BACKGROUND

A serious problem associated with turbine pumps and their rotating parts is the overheating of the bearings in which the parts rotate. Bearing overheating can result from the interruption of the flow of lubricating oil due to particle contamination of the needle valve or ambient temperature change.

In a typical pump system, the lubricating oil is gravity fed from an oil container drum and regulated through a sight gauge by an adjustable needle valve to provide a flow of approximately 6 to 8 drops per minute for each 100 feet of pump length. It is delivered to the stretch bearing at the top of the well though a ¼" copper tube and then through grooves cut in the line shaft bearings, which are spaced at five foot intervals, all the way down to the bottom of the well where the pump bowl is located. The needle valve regulator is sensitive to moisture, dust and various foreign particles, all of which are present in the atmosphere in certain environments, and all of which cause clogging in the needle valve. Oil flow interruption can also be caused by a drop in ambient temperature. As the ambient temperature declines, the viscosity of the lubricating oil flowing from the oil container drums increases. The colder the temperature becomes, the thicker the oil becomes, and the slower the oil flows through the needle valve. When the ambient temperature has declined sufficiently, the oil becomes so thick that it cannot pass through the needle valve and onto the pump line shaft and bearings. Oil flow to the line shaft and bearings can also be terminated by the pump operator's failure to keep a supply of oil in the oil reservoir. The consequent loss of oil flow causes increased friction which, in turn, permits the pump shaft and bearings to overheat.

After the lubricant flow interruption, temperatures in the line shaft may exceed the flash point of the oil used to lubricate the line shaft and bearings, causing residual oil in the shaft to vaporize. If the pump continues operation thereafter without lubrication, the bearing temperature will continue to rise, causing the bearings to experience massive wear very quickly and to flake off into the oil tube and onto the bearings below. Flaking of a bearing plugs up the oil transport groove in the bearing immediately below the flaking bearing, and, thereby, permanently stops oil flow to the bearings further down the line shaft, which results in pump shaft failure.

Pump shaft failure involves expensive repairs and loss of service while the well is down. In agriculture, crucial periods in crop growth require a constant supply of irrigation water; consequently, any significant loss of water supply at such times results in partial or complete crop failure.

Prior art patents offer some suggestions for dealing with the problem of bearing failure resulting from excessive temperature. Heckert (U.S. Pat. No. 2,089,369) described an overheated bearing and journal detection and identification system associated with wheel axles of railway cars. Heckert's heat detection system relied on the melting point of a fusible closure disk immediately associated with a journal box and bearing.

Others have resorted to the use of various temperature sensing means imbedded in the bearing itself, or, alternatively, in the bearing housing support to detect and monitor bearing temperatures (Waseleski et al., U.S. Pat. Nos. 3,824,579; Bergman et al. 4,074,574; Gustafson 3,052,123; Reumund 2,964,875). However, because bearings associated with turbine pumps are located within oil tube line shaft encasements surrounded by flowing fluid, such as water or oil, temperature sensors embedded in such bearings may be inaccurate and their temperature readings unreliable. Even the flow of fluid below the bearing affects the temperature perceived by a sensor embedded in the bearing. Sometimes a packing heats up instead of a bearing, but a sensor imbedded in the bearing is not sensitive to the packing temperature, and it is not practical to embed a sensor in the packing.

Devices and methods for detecting bearing overheating using infrared sensors have also been considered. Gallagher (U.S. Pat. No. 5,448,072) teaches a means of determining hot bearings and hot wheels of a train by monitoring the end caps of train wheels with an infrared scanner. Gallagher determined that the temperature of the end caps gives an accurate indication of the bearing temperature. Duhrkoop (U.S. Pat. No. 5,478,151) teaches a device for detecting overheated bearings in rail cars and other moving objects using an infrared beam detector and multiple lenses, each one of which is aimed at a different measuring point, and a scanning device which periodically picks up the measuring beams and focuses the beams onto the detector. The patents discussed above are directed toward overheating of bearings in railroad cars.

Because the bearings in a pump system are located either within the pump casing or within the oil tube, which descends deep into the ground, determining overheating in pump bearings presents unique problems. However, it has been discovered that the stretch bearing, which is located in the pump head and positioned on the pump line shaft above the level of fluid flow through the pump column and discharge head, overheats and fails first.

Senior, Jr. et al (U.S. Pat. No. 5,145,322) teaches a device and method for detecting overheating in deep well water pump bearings by placing a temperature probe in a bore drilled in the stretch bearing and opening into an air space communicating between the oil inlet chamber below the dust seal packing and the oil tube space. Although Senior teaches an effective means of detecting bearing overheating, it requires retrofitting an existing pump to accommodate the device. Retrofitting an existing pump requires partially disassembling the pump, which further requires machinery and man power.

SUMMARY OF THE INVENTION

It is an object of this invention to overcome the problems of the prior art and provide an inexpensive, accurate method of early detection and system shutdown in the presence of abnormal temperatures before bearing damage or pump failure occurs, saving costly repair bills and preventing loss due to water supply interruption.

The device of this invention may be retrofitted to an existing pump or incorporated into original equipment manufacture;

The device of this invention may be adapted to remote audio or visual warning;

Other objects and features of this invention will become apparent hereinafter.

DETAILED DESCRIPTION OF THE PREFERRED EMBODIMENTS

Figure 1:
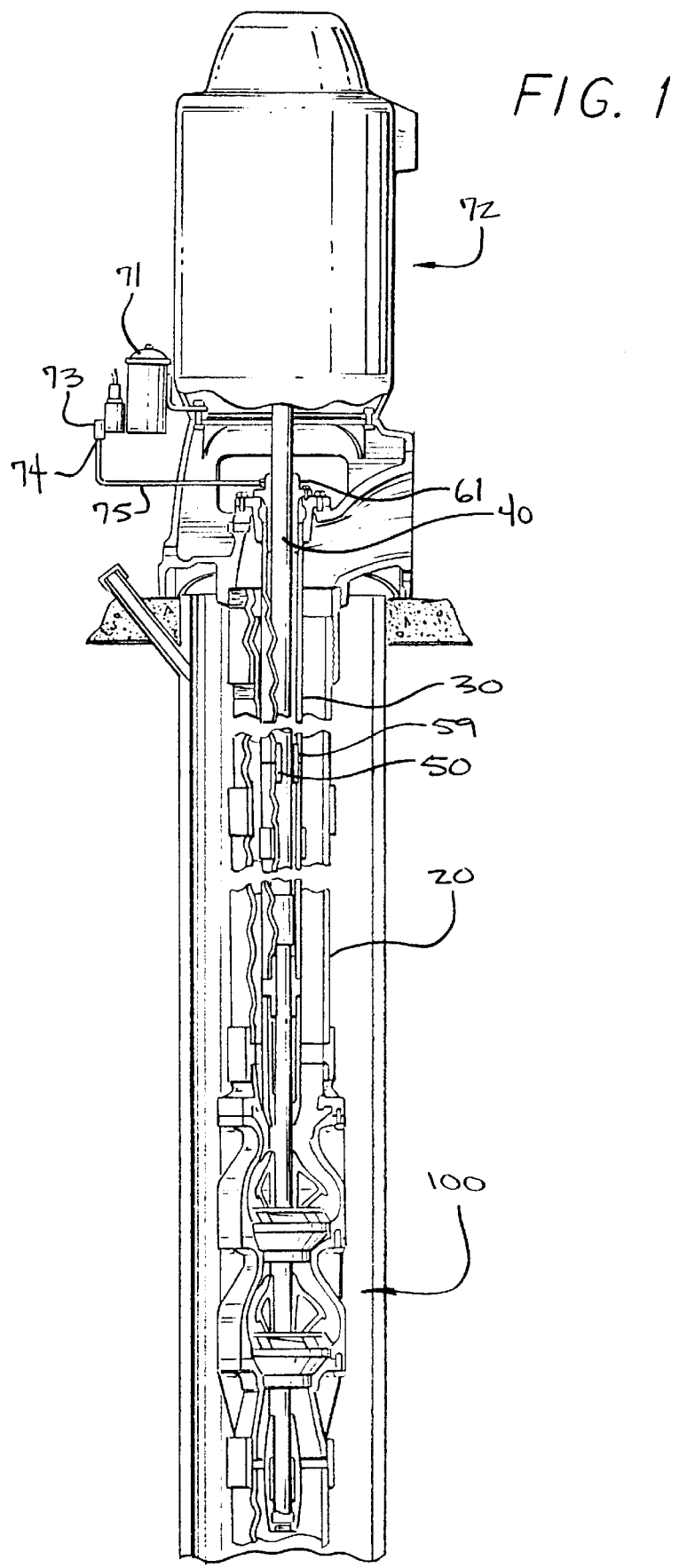
FIG. 1 is an elevation view of a turbine pump, partially broken away to show interior details.

As shown in FIG. 1, a typical turbine pump system 10 includes pump column 20, pump head 5, oil tube 30, line shaft 40, and line shaft bearings 50. Pump column 20 carries fluid from the water or fluid supply. The fluid is then discharged from the pump system through discharge head 21, which is mounted on pump column 20. Fluid-tight oil tube 30 is centered within column 20 and pump line shaft 40 is centered within oil tube 30. Line shaft 40 turns within line shaft bearings 50, which are conventionally located at five foot intervals along line shaft 40 to the bottom of the well where the pump bowl 100 is located. Stretch assembly 63 is positioned on the top of oil tube 30 in pump head 5. Stretch assembly 63 includes stretch plate 60 and stretch bearing 61. Stretch bearing 61 is positioned on stretch plate 60 such that wider head portion 61A of stretch bearing 61 rests on top of stretch plate 60 while cylindrical body portion 61B of stretch bearing 61 extends downward through a central opening in stretch plate 60. Body portion 61B is threadedly engaged with oil tube 30 such that oil tube 30 is pulled taunt as stretch bearing 61 is turned into engagement with the oil tube. Line shaft 40 extends from the bowl assembly, through stretch plate 60 and stretch bearing 61, and into the pump motor 72.

A lubricating oil is gravity fed from an oil delivery reservoir 71 serving the well vertical turbine pump system 10, and regulated through a sight gage 74 by an adjustable needle valve oil regulator 73 providing an oil flow measured in drops per minute, oil is delivered through tube 75 passing through stretch bearing 61 of the pump line shaft 40. The oil then seeps through grooves cut in line shaft bearings 50, which are conventionally spaced at five foot intervals along the pump line shaft 40, to the bottom of the well where the pump bowl is located.

Because stretch bearing 61 is positioned on line shaft 40 above the level of fluid flow through pump column 20 and discharge head 21, it is not cooled by the flowing fluid. Consequently, when oil delivery is interrupted, stretch bearing 61 overheats first and, therefore, fails first. It has been discovered that a temperature sensing means placed on line shaft 40 directly above stretch bearing 61 can be used to monitor the temperature of bearing 61 and thereby detect imminent failure due to overheating of bearing 61 which precedes failure of the remaining line shaft bearings 50.

Figure 2:
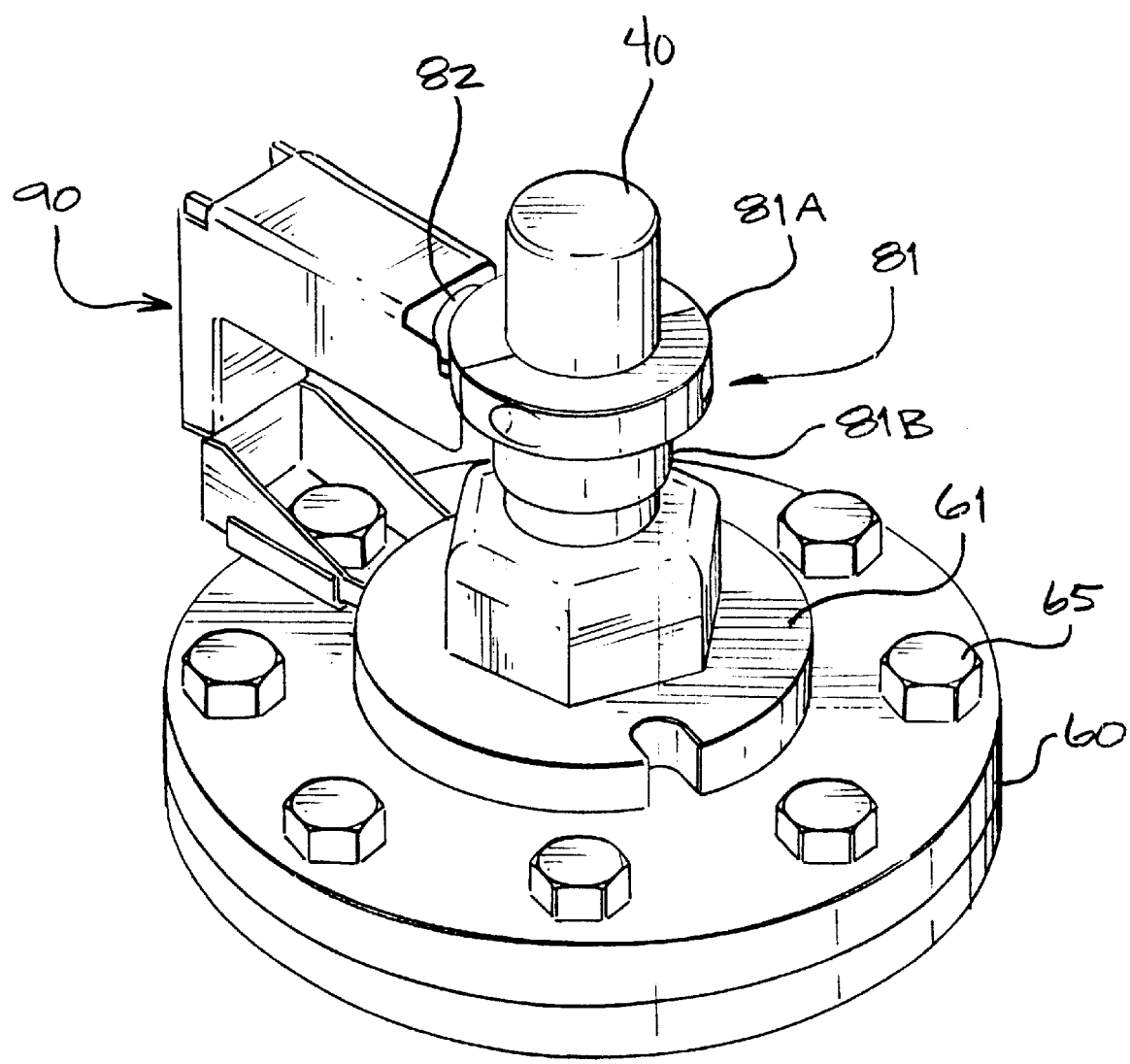
FIG. 2 is a perspective view of the stretch plate and stretch bearing showing the temperature transmitting collar and infrared sensor mounted thereon.

As shown best in FIG. 2, the temperature sensing means of the present invention includes temperature transmitting collar 81 and infrared sensor 82. Collar 81 comprises two releasably joined parts. Because of its two part construction, collar 81 may be easily mounted to the line shaft of an existing pump system. In the preferred embodiment, collar 81 is made of carbon steel with a baked black oxide finish. The top portion 81A of collar 81 is thicker than the bottom portion 81B of the collar. Thicker portion 81A facilitates attachment of the two halves of the collar by means such as allen screws and is preferably made to approximately ½ inch thickness. Thinner portion 81B, which is preferably about 125 thousandths of an inch thick, facilitates the communication of heat from line shaft 40 through collar 81 and to sensor 82.

Figure 4:
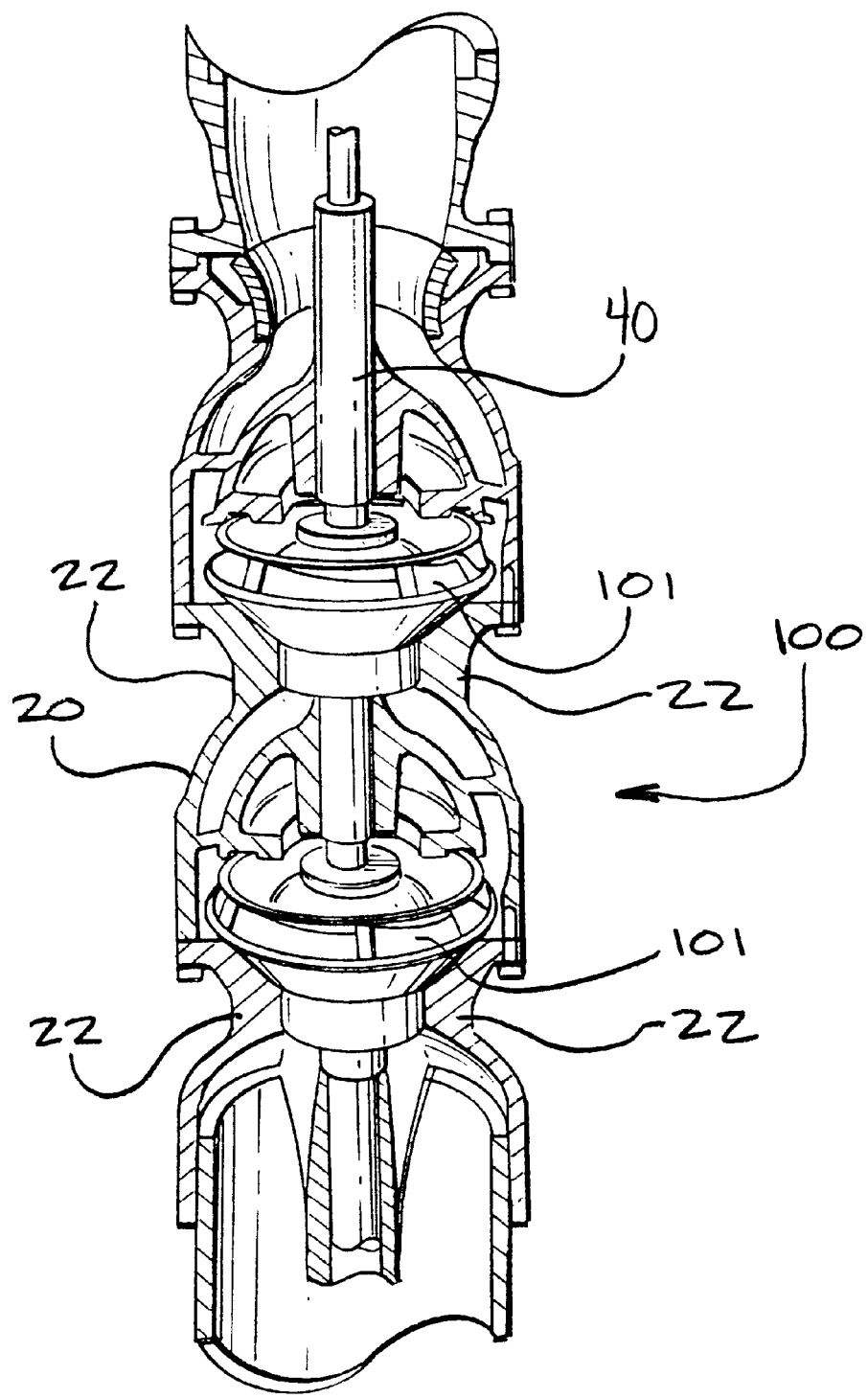
FIG. 4 is a sectional view showing the pump bowl assembly.

Collar 81 is mounted on line shaft 40 immediately adjacent to stretch bearing 61 such that a space of approximately 20 thousandths of an inch is left between stretch bearing 61 and collar 81. Collar 81 should be mounted to line shaft 40 prior to lateral adjustment of the line shaft and its connected bowl assembly 100, shown best in FIG. 4. Lateral adjustment of the line shaft and bowl assembly is necessary to keep impellers 101 of bowl assembly 100 from dragging and rubbing against the pump column 20 at points 22. The space between collar 81 and stretch bearing 61 should be about 20 thousandths of an inch before lateral adjustment of the line shaft. After lateral adjustment of the line shaft, the space between collar 81 and stretch bearing 61 should be no more than 1 inch. Collar 81 should never touch stretch bearing 61.

In an alternative embodiment of the invention, a temperature transmitting coating is applied directly to shaft 40 at about 20 thousandths of an inch above stretch bearing 61. When a temperature transmitting coating is applied, it is preferred that a black oxide coating be used.

Sensor 82 is held in place by bracket 90. As shown in FIG. 2, cap screws 65 are located about the circumference of stretch plate 60. Bracket 90 is held in place on stretch plate 90 by one of cap screws 65. Bracket 90 functions to hold sensor 82 at the height of thinner portion 81B of collar 81. In order to accurately sense the temperature being transmitted by collar 81, sensor 82 should be no further than ½ of an inch away from thinner portion 81B of collar 81.

Figure 3:
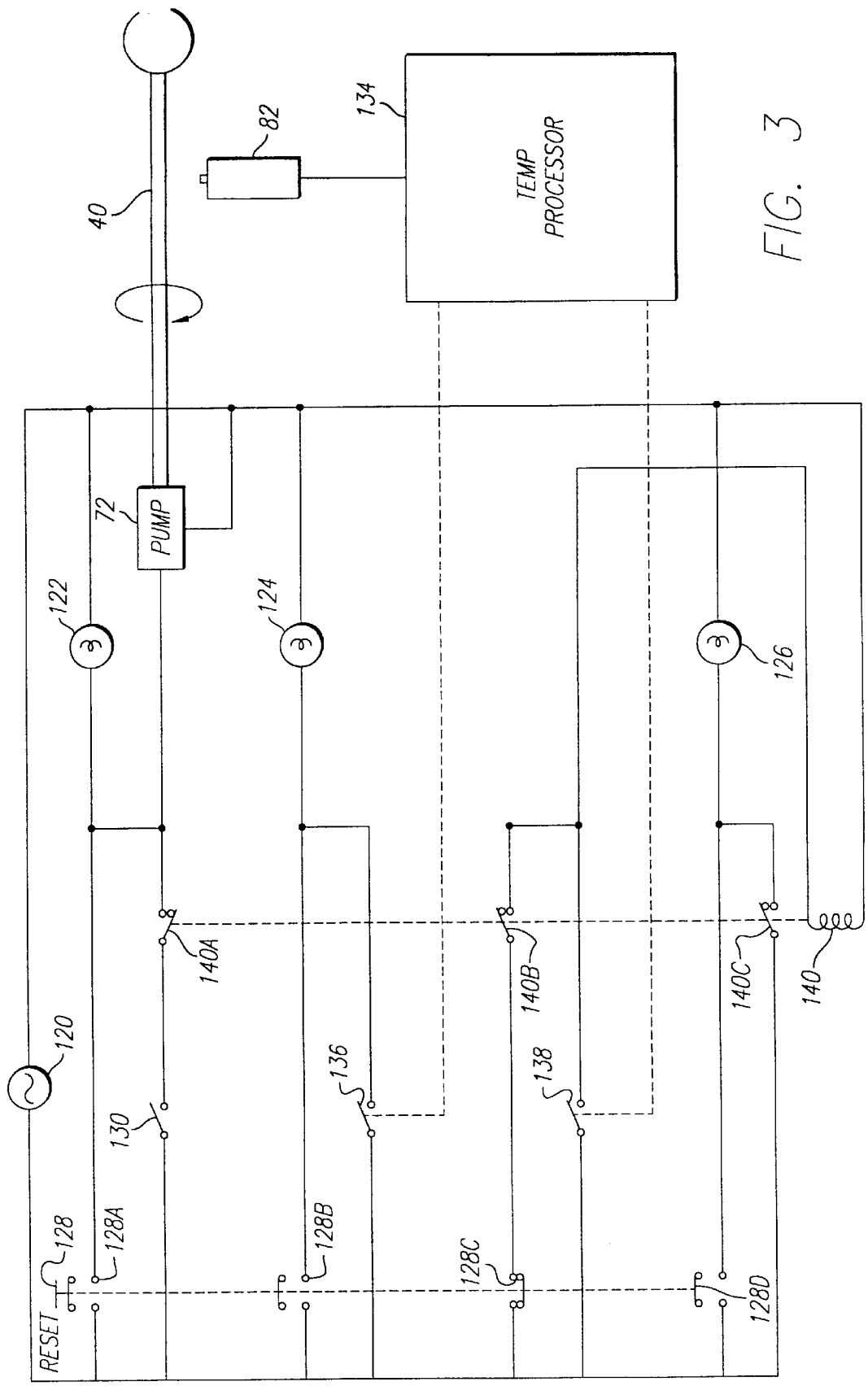
FIG. 3 is a circuit diagram of a control circuit used with the detection device of FIGS. 1 and 2.

FIG. 3 is a schematic circuit diagram of the control circuitry which is operated in conjunction with the sensor 82 of FIGS. 1 and 2. As indicated in FIG. 3, alternating current power source 120, which may be of any conventional type, supplies operating power to the pump motor 72 and other components of the system. Prior to operation of the system, a momentary push-button reset switch 128 typically is depressed to close three sets of normally open contacts 128A, 128B, and 128D and to open one set of normally closed contacts 128C. Closure of the contact 128A, 128B, and 128D supplies operating power from the source 120 through three indicator light bulbs 122, 124, and 126 to operate those bulbs. Operation of the switch 128 is made prior to turning on the pump to ensure that the bulbs 122, 124, and 126 are operable. If operation of switch 128 does not cause illumination of one or more of the bulbs 122, 124, or 126, replacement is made.

Following a successful test of the operation of the indicator bulbs 122, 124 and 126, the push-button switch 128 is released; and the switch contact pairs 128A, 128B, and 128D and 128C assume the positions shown in the drawing. The system then is ready for normal operation.

To initiate operation by turning on the pump motor 72, an on/off switch 130 is closed. This applies operating power across the switch 130 and the normally closed contact 140A of a relay operated switch to the pump motor 72, which commences operation in its normal fashion. At the same time, it can be seen that the indicator light 122 is illuminated, showing that the pump is in operation. Under normal conditions of operation, the status of the circuit and the various switches which are shown is as shown in FIG. 3, with the exception of the pump operating switch 130, which is closed, as described above. The pump motor 72 then rotates the shaft 40 in the manner described previously, and the infrared sensor 82 supplies a continuous indication of the temperature of the shaft 40 to a temperature processor 134. As long as the shaft temperature remains in a normal range, nothing more happens to change the status of the circuit shown in FIG. 3.

If the temperature of the shaft 40, as indicated by the infrared sensor 82, increases to a level which is considered an early warning temperature of a possible malfunction, the signal from the sensor 82 is processed by the temperature processor 134 to cause closure of a switch 136, as indicated by the connections from the switch 136 to the processor 134. The manner in which the switch 136 is actually operated may be any one of a number of conventional operations, including electromechanical or fully electronic operation. The dot-dash line from the switch 136 to the processor 134, however, indicates the operating connection from the processor 134 to the switch 136. When the switch 136 is closed, the "high temperature" indicator 124 is illuminated. This places the operator of the system observing this light on notice that a malfunction may be about to occur. Corrective steps can be taken to ensure the oil flow and other operating conditions are corrected, if there is some problem with the oil supply. Once the situation is corrected, the infrared sensor 82 provides a lower temperature indication to the processor 134, which then effects opening of the switch 136. This then causes the light 124 to be turned off or extinguished, since the push-button contact pair 128B also is open during normal operation of the system.

In the event, however, that the temperature sensed by sensor 82 continues to rise to an alarm condition, the processor 134 additionally operates another normally open switch 138 to close that switch. As can be seen from the circuit of FIG. 3, this applies operating power through an alternating current relay, diagrammatically depicted as a coil 140, to energize the relay 140. This causes operation of switches 140B, 140B, and 140C. As shown in FIG. 3, the normally closed switch 140A is opened when the relay coil 140 is activated. This immediately breaks the operating circuit for the pump motor 72, turning off the pump. This also extinguishes the "power on" light 122. At the same time, closure of the normally open contact 140B causes a holding current to be applied through the relay coil 140 by way of the normally closed reset switch pair 128 and the now-closed contact 140B. As a result, the relay 140 remains operated until the reset push-button 128 once again is momentarily operated. When the relay coil 140 is energized, it also closes a normally open switch 140C to illuminate the alarm temperature light 126. When the system is in this condition of operation, both the high temperature light 124 and the alarm temperature light 126 are illuminated. Consequently, a clear indication is provided to an operator observing a control panel, on which the lights 122, 124 and 126 are placed, that remedial action needs to be taken.

After appropriate remedial action has been taken, momentary closure of the reset push-button switch 128 causes an opening of the holding circuit contacts 128C to break the power supply to the relay coil 140. When this occurs, the contacts 140A. 140B and 140C return to the position shown in FIG. 3, and the alarm system has been reset. Release of the push-button switch 128 then causes all of the contacts to assume the position shown in FIG. 3, and the system is ready for normal operation in accordance with the procedure described above.

The temperature transmitting collar, infrared sensor and control circuitry described above can also be used to detect bearing overheating in product lubricated pump systems. In product lubricated pump systems, over-tightening of the packing glands in the stuffing box or mechanical seal can create too much compression about the line shaft, which causes excessive heat to be generated as the line shaft turns. Heat created by this excessive friction melts the lubricant in the stuffing box or the O-rings of the mechanical seal, resulting in failure of the stuffing box or mechanical seal. In product lubricated pump systems, the temperature transmitting collar is positioned between the stuffing box or mechanical seal and the pump motor. The temperature transmitting collar should be mounted on the line shaft immediately adjacent to the stuffing box or mechanical seal. Alternatively, a temperature transmitting coating such as black oxide can be applied directly to the line shaft immediately adjacent to the stuffing box or mechanical seal. As described above, an infrared sensor is then positioned within sensing range of the collar or coating.

We claim:

1. A means for detecting bearing overheating in a turbine pump system having a pump column and discharge head for fluid flow, an oil tube centered in said pump column and extending upward to a stretch assembly positioned above the area of fluid flow through said discharge head, a line shaft centered within said oil tube and extending through said stretch assembly, said means comprising a collar of temperature transmitting material mounted on said line shaft adjacent to said stretch assembly, and an infrared sensor placed within sensing distance of said collar.

2. The means of claim 1 wherein said collar is of two part construction such that the two parts of said collar may be separated to facilitate attachment to said line shaft and then reattached for mounting on said line shaft.

3. The means of claim 1 wherein said collar is of carbon steel with a baked black oxide finish.

4. The means of claim 1 wherein said sensor is held in place by a bracket mounted to said stretch plate such that said sensor is held within sensing distance of said collar.

5. The means of claim 1 wherein said collar is a temperature transmitting coating applied directly to said line shaft.

6. A method of detecting bearing overheating in a pump system having a pump column and discharge head for fluid flow, an oil tube centered in said pump column and extending upward to a stretch assembly positioned above the area of fluid flow through said discharge head, a line shaft centered within said oil tube and extending through said stretch assembly, said method comprising the steps of mounting a collar of temperature transmitting material on said line shaft adjacent to said stretch assembly, and placing an infrared sensor within sensing distance of said collar.

7. The method of claim 6 wherein said collar is of two part construction such that the two parts of said collar may be separated to facilitate attachment to said line shaft and then reattached for mounting on said line shaft.

8. The method of claim 6 wherein said collar is of carbon steel with a baked black oxide finish.

9. The method of claim 6 wherein said sensor is held in place by a bracket mounted to said stretch assembly such that said sensor is held within sensing distance of said collar.

10. The method of claim 6 wherein said collar is a temperature transmitting coating applied directly to said line shaft.

11. The means according to claim 1 further including a circuit responsive to signals obtained from said infrared sensor for producing an alarm indication in response to the sensing of a temperature in excess of a predetermined amount.

12. The means of claim 11 further including a source of electric power and a pump coupled with the source of electrical power for rotating said line shaft wherein said temperature sensing circuit is coupled with said source of operating power for interrupting the supply of said power to said pump when said predetermined temperature is reached.

* * * * *

UNITED STATES PATENT AND TRADEMARK OFFICE
CERTIFICATE OF CORRECTION

PATENT NO. : 6,312,226 B1
DATED : November 6, 2001
INVENTOR(S) : Senior, Jr. et al.

Page 1 of 1

It is certified that error appears in the above-identified patent and that said Letters Patent is hereby corrected as shown below:

<u>Title page,</u>
Inventor's address should be corrected to delete the city name "Fresbi," and add the city name -- Fresno. --

Signed and Sealed this

Second Day of April, 2002

Attest:

JAMES E. ROGAN
*Attesting Officer*     *Director of the United States Patent and Trademark Office*